US009025463B1

(12) United States Patent
Mankee et al.

(10) Patent No.: US 9,025,463 B1
(45) Date of Patent: May 5, 2015

(54) INTELLIGENT AIR-INTERFACE CONGESTION MANAGER

(75) Inventors: Adeel Mankee, Lenexa, KS (US); Muhammad Saad Safiullah, Overland Park, KS (US); Hassan Raza, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 245 days.

(21) Appl. No.: 13/451,917

(22) Filed: Apr. 20, 2012

(51) Int. Cl.
*H04L 12/801* (2013.01)
*H04W 72/04* (2009.01)

(52) U.S. Cl.
CPC .................. *H04W 72/0413* (2013.01)

(58) Field of Classification Search
USPC ....................................................... 370/237
See application file for complete search history.

(56) References Cited

U.S. PATENT DOCUMENTS

| 7,190,961 | B2 | 3/2007 | Burr | |
| 7,260,403 | B1 | 8/2007 | Zhang | |
| 7,844,295 | B1 | 11/2010 | Ngan | |
| 2009/0275336 | A1* | 11/2009 | Hamada | 455/437 |
| 2011/0009062 | A1* | 1/2011 | Anschutz et al. | 455/41.2 |
| 2011/0216655 | A1* | 9/2011 | Chen et al. | 370/241 |
| 2012/0250603 | A1* | 10/2012 | Huang et al. | 370/315 |
| 2013/0051331 | A1* | 2/2013 | Bao et al. | 370/329 |

* cited by examiner

*Primary Examiner* — Kevin C Harper
*Assistant Examiner* — Jeff Banthrongsack

(57) ABSTRACT

A system and method for intelligently managing wireless congestion in a wireless telecommunications network is provided. An ad-hoc device relay is built to communicate data from a mobile device in a congested coverage area to a base station in an uncongested coverage area. Embodiments of the invention optimize the relay through careful device selection and management.

20 Claims, 7 Drawing Sheets

INTELLIGENT AIR-INTERFACE CONGESTION MANAGER

SUMMARY

Embodiments of the invention are defined by the claims below, not this summary. A high-level overview of various aspects of embodiments of the invention are provided here for that reason, to provide an overview of the disclosure and to introduce a selection of concepts that are further described below in the Detailed-Description section. This Summary is not intended to identify key features or essential features of the claimed subject matter, nor is it intended to be used as an aid in isolation to determine the scope of the claimed subject matter.

In a first aspect, a method for conserving bandwidth in a radio access network is provided. The method includes determining that above a threshold amount of a first base station's wireless spectrum is in use. The method also includes determining that less than the threshold amount of a second base station's wireless spectrum is in use. The method also includes, in response to making the determinations, building an ad-hoc wireless-device relay comprising a plurality of wireless devices within the first base station's coverage area or the second base station's coverage area. The method also includes relaying data from a mobile device located within the first base station's coverage area to the second base station via the ad-hoc wireless-device relay.

In another aspect, one or more computer-readable media having computer-executable instructions embodied thereon that when executed by a computing device perform a method of conserving wireless spectrum allocated to a first base station by routing communication sessions over an ad-hoc wireless-device relay to a second base station is provided. The method includes determining, by running a band pass filter, that above a threshold amount of a first base station's wireless spectrum is in use. The method also includes determining locations for active devices within the first base station's coverage area or the second base station's coverage area by accessing a location database that records mobile device locations. The method also includes building an ad-hoc wireless-device relay comprising a plurality of wireless devices located within the first base station's coverage area or the second base station's coverage area. The plurality of wireless devices are selected based on being less than a threshold distance from each other. The method also includes identifying an ongoing communication session having a best-effort level of service, the ongoing communication session occurring between a first device and the first base station. The method also includes transferring the ongoing communication session from the first base station to the second base station via the ad-hoc wireless-device relay.

In a third illustrative aspect, one or more computer-readable media having computer-executable instructions embodied thereon that when executed by a computing device perform a method of reducing bandwidth usage within a first base station's coverage area by routing communications to a second base station over an ad-hoc wireless-device relay is provided. The method also comprises detecting that above a threshold amount of spectrum allocated to the first base station is being used. The method also comprises selecting a plurality of wireless devices to use to form an ad-hoc wireless-device relay by analyzing characteristics of a plurality of devices. The method also comprises building the ad-hoc wireless-device relay using devices from the plurality of devices, the devices being selected to keep power used by devices in the relay below a threshold consumption. The method also comprises communicating data from a device in the first base station's coverage area to the second base station using the relay.

BRIEF DESCRIPTION OF THE SEVERAL VIEWS OF THE DRAWINGS

Illustrative embodiments of the present invention are described in detail below with reference to the included drawing figures, wherein.

DETAILED DESCRIPTION

Embodiments of the present invention provide a system and method for managing bandwidth used by a base station within a radio access network. Embodiments of the invention use mobile devices located within a congested coverage area to communicate radio signals from a device in the congested area to a different base station with available bandwidth. The devices used to communicate the radio signals are first formed into an ad-hoc device relay. Embodiments of the invention optimize selection of devices for inclusion in the relay and add or subtract devices from the relay in response to changing circumstances.

Throughout the description of embodiments of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of embodiments of the present invention.

API Application Interface
CDMA Code Division Multiple Access
CD-ROM Compact Disk Read Only Memory
DVD Digital Versatile Discs
EEPROM Electrically Erasable Programmable Read Only Memory
GSM Global System for Mobiles
LAN Local Access Network
PDA Personal Digital Assistant
PDSN Packet Data Serving Node/Home Agent
RAM Random Access Memory
ROM Read Only Memory
SMS Short Messaging Service SMSC Short Messaging Service Center
SIP Session Initiation Protocol
TDMA Time Division Multiple Access Embodiments of the present invention may be embodied as, among other things: a method, system, or computer-readable media with computer-executable instructions embodied thereon. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs ("DVD"), holographic media or other optical disc storage, magnetic cassettes, magnetic tape, magnetic disk storage, and other magnetic storage devices. These technologies can store data momentarily, temporarily, or permanently. The computer-readable media is nontransitory.

Figure 1:
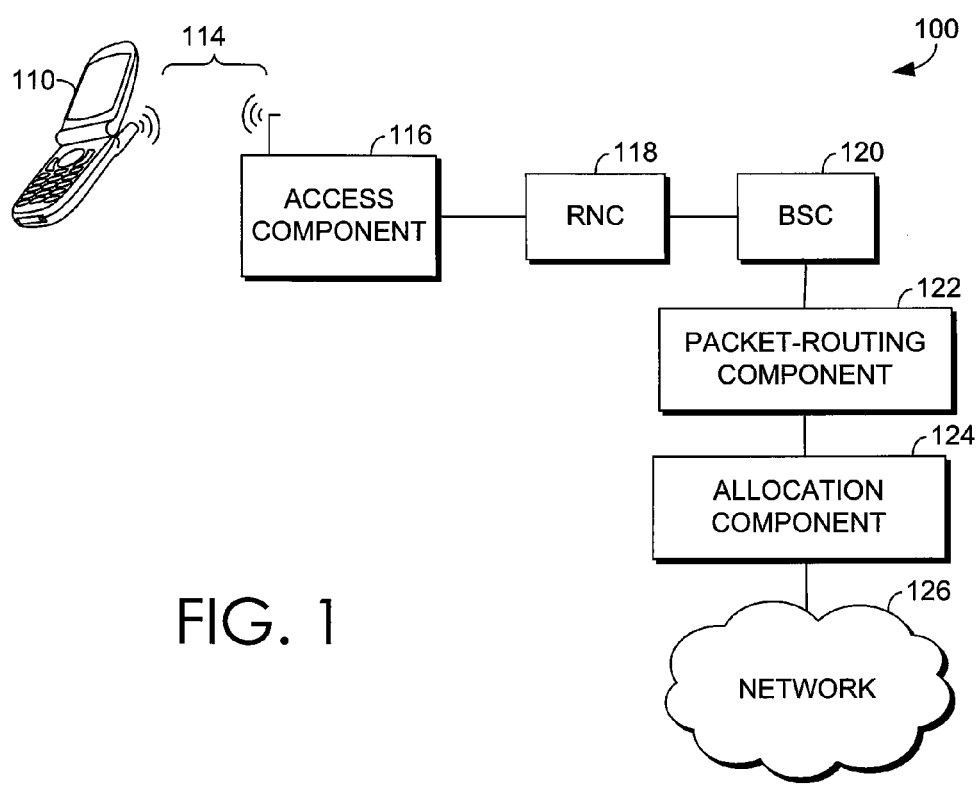
FIG. 1 is a diagram showing an illustrative operating environment suitable for practicing embodiments of the present invention.

Embodiments of the present invention may be practiced in a communications network providing service to devices communicatively coupled to the communications network. An illustrative operating environment 100 that contains a few of the components within such a communications network is shown in FIG. 1. The components shown in FIG. 1 are a few of the components that embodiments of the invention may interact with during operation. The components shown in FIG. 1 are described in brief and with an emphasis on function for the sake of simplicity. The components within FIG. 1 are communicatively coupled to each other in a manner appropriate for carrying out their respective function within the illustrative operating environment 100. Embodiments of the present invention are not limited by the communication protocols or formats used to facilitate communications between components; those mentioned are for the sake of enablement and are not meant to be limiting.

Mobile device 110 communicates with an access component 116 by way of a communications link 114. Mobile device 110 is a wireless terminal that is adapted to receive communications and media over the wireless networks included in illustrative operating environment 100. Some lower-level details of mobile device 110 are not shown so as to not obscure embodiments of the present invention. For example, mobile device 110 may include a bus that directly or indirectly couples the following devices: memory; one or more processors; one or more presentation components such as a display or speaker; input/output (I/O) ports; I/O components; and a power supply such as a battery. Mobile device 110 may communicate via wireless protocols, such as code division multiple access ("CDMA"), global system for mobiles ("GSM"), or time division multiple access ("TDMA"), as well as others, to communicate with access component 116.

Mobile device 110 may take on any of a variety of forms. By way of example, mobile device 110 may be a mobile telephone, smart phone, laptop computing device, desktop computing device, server, personal digital assistant ("PDA"), or any combination of these or other devices. Mobile device 110 is capable of accessing content over the Internet. Examples of content that may be received include text messages, multimedia messages, emails, calendar updates, web pages, videos, pictures, and task reminders. The mobile device 110 may stream the video to a video-sharing server that hosts a website through which the videos may be viewed by others. The mobile device 110 may be associated with a user. The user is the person submitting instructions and interacting with the mobile device 110. The illustrative operating environment 100 may have any number of mobile devices. One mobile device 110 is shown for the sake of simplicity.

Communications link 114 may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using 802.11 protocol. This network is illustrated in FIG. 1 as item 126. A long-range connection may include a connection using one or more of CDMA, GPRS, GSM, TDMA, and 802.16.

Generally, the access component 116 provides access to what some skilled artisans refer to as a wireless communications network, also termed a core network, illustrated in FIG. 1 as network 126. A wireless communications network may comprise one or more of the components illustrated in FIG. 1. Not all components that make up a wireless communications network are shown. Also, not all connections or possible connections are shown. The access component 116 may be one or more of a base transceiver station (BTS) tower (alternatively called a base station), a Wireless access component, a Mobile Hotspot, and any other device that facilitates communication between mobile device 110 and network 126. In one embodiment, the access component 116 includes both a Wireless access component and a BTS tower. In another embodiment, access component 116 is a BTS tower.

A radio network controller (RNC) 118 performs various functions, such as managing radio channels, power control, load control, admission control, packet scheduling, handover control, macrodiversity, security functions, and mobility management. A base station controller (BSC) 120 is also shown in FIG. 1. The BSC acts as the intelligence behind base transceiver stations (BTS) and handles allocation of radio channels, receives measurements from mobile devices, and controls handovers from one BTS to another BTS. As such, the BSC 120 may receive location data from mobile devices that may have been measured using a global positioning system (GPS), an assisted GPS (AGPS), or network measurements, such as estimations of a mobile device's current location based on signal strength, power levels, etc., from the base stations. For example, data may be collected from network switches, as base stations gather data at the switch level.

In one embodiment, the BSC 120 includes a set of computer-executable instructions that helps carry out various aspects of technology described herein. For example, the BSC 120 may select devices for inclusion in an ad-hoc relay, initiate instructions to the mobile devices that set up an ad-hoc relay, and otherwise manage the relay. In another embodiment, these functions are handled by a separate network device, not shown.

The components illustrated in FIG. 1, such as those that may be included in a wireless communications network include a packet-routing component 122 and an allocation component 124. As mentioned, other components not shown here may also be used to carry out aspects of the present invention. For instance, a customer-profile database and an authentication component, such as an authentication, authorization, and accounting (AAA) server may be included in the wireless network, although not shown in FIG. 1. Further, several components shown in FIG. 1 may be combined into a single component although shown separately in FIG. 1. A packet-routing component 122 may be known to those of ordinary skill in the art as a packet data serving node (PDSN), typically used in CDMA networks; a foreign agent (FA); a Local Mobility Anchor (LMA) used for PMIP functions in the PDSN for IPv6; or a serving GPRS support node (SGSN), typically used in GSM and UMTS networks. Additionally, an Access Service Network (ASN) gateway may be used and is typically used in WiMAX networks.

The packet-routing component 122 acts as the serving point between the radio access and IP networks. It is responsible for managing point-to-point protocol (PPP) sessions between the mobile provider's core IP network 126 and the mobile device 110. At a high level, the packet-routing component 122 helps provide access to the Internet as well as to other network technologies and application services. It helps provide mobile IP (MIP) access, one-agent support, and transportation of packets to facilitate the tunneling or communicating of data through virtual private networks. It can act as a client for an authentication server, which helps ensure that mobile device 110 is authorized to communicate via the wireless communications network. Further, in one embodiment, the packet-routing component 122 is a Serving Gateway, the allocation component 124 is a Packet Data Network Gateway (P-GW), and the authentication component (not shown) is a Home Subscriber Server (HSS). In one embodiment, the packet-routing component 122 includes a set of computer-executable instructions that helps carry out various aspects of technology described herein.

Figure 2:
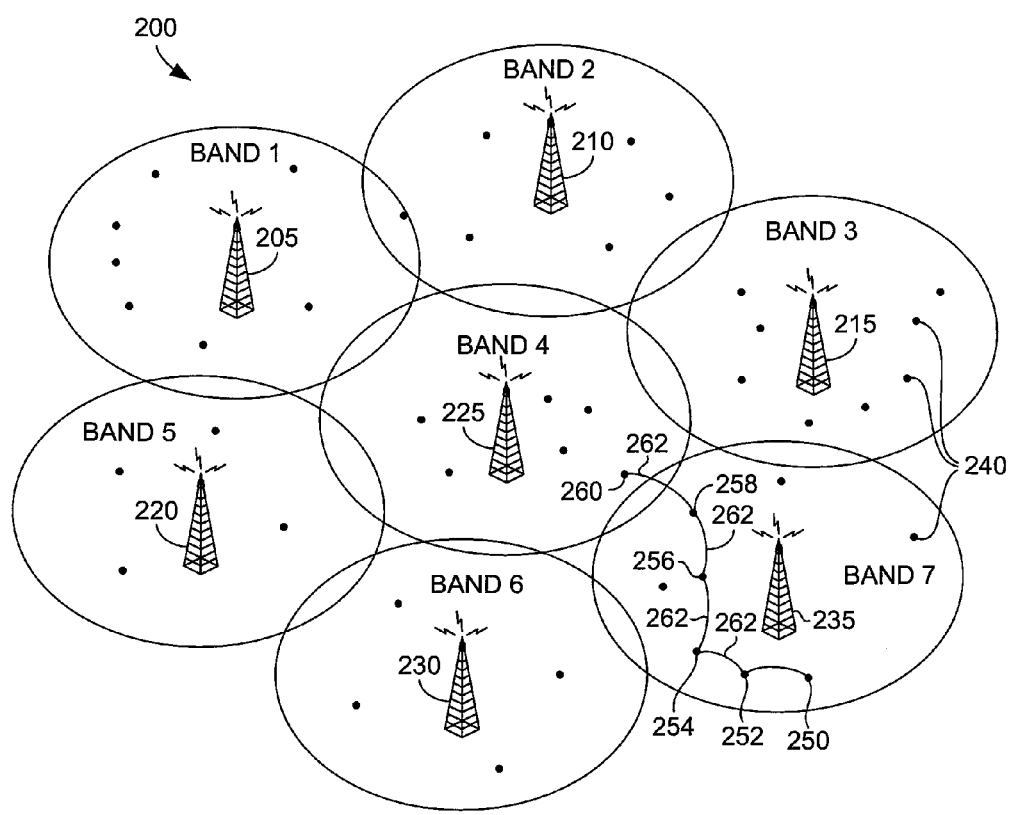
FIG. 2 is a diagram showing components of a wireless access network in accordance with an embodiment of the present invention.

Turning now to FIG. 2, select components of a wireless access network 200 are shown, in accordance with an embodiment of the present invention. The wireless access network 200 may provide voice and data service to wireless devices. The wireless devices may communicate using radios. Using the radios, a communication link is established between wireless devices and base stations.

The wireless access network 200 shown includes base stations 205, 210, 215, 220, 225, 230, and 235. Each base station is able to communicate with mobile devices within a coverage area depicted by the ovals. Each base station communicates within a spectrum, or band, allocated to the base station. For example, base station 205 communicates within band 1. Base station 210 communicates within band 2. Base station 215 communicates within band 3. Base station 220 communicates within band 5. Base station 225 communicates within band 4. Base station 230 communicates within band 6. And base station 235 communicates within band 7. Generally, adjacent base stations such as base station 225 and base station 235 will be allocated different bands to prevent the radio signals transmitted by the base stations from interfering with each other.

The black dots within FIG. 2 represent wireless devices. Exemplary wireless devices have been described previously. The wireless devices are depicted as dots. Dots that are used to illustrate embodiments of the present invention are given numbers. An ad-hoc wireless-device relay comprising multiple mobile devices is shown and designated with the number 262. The ad-hoc wireless-device relay 262 communications data from mobile device 250 to mobile device 260, which then communicates the data to base station 225. The ad-hoc relay 262 uses mobile device 252, 254, 256, and 258 to communicate wirelessly with adjacent devices to form the relay. Essentially, the mobile devices within the ad-hoc communication relay 262 act as repeaters. Methods of building the ad-hoc relay 262 and passing communications through the relay will be described in more detail subsequently in FIGS. 5-7.

Figure 3:
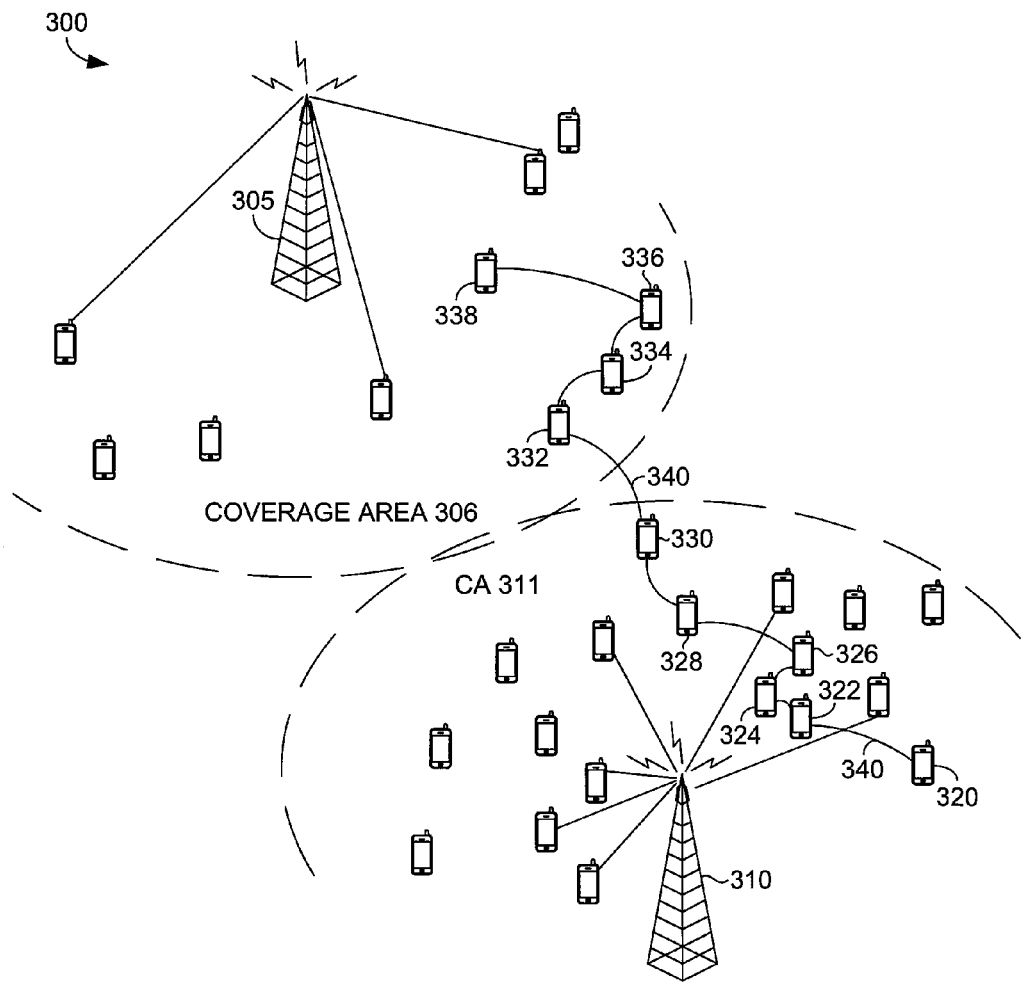
FIGS. 3 and 4 are diagrams showing device adjustments within an ad-hoc communications relay, in accordance with an embodiment of the present invention.
Figure 4:
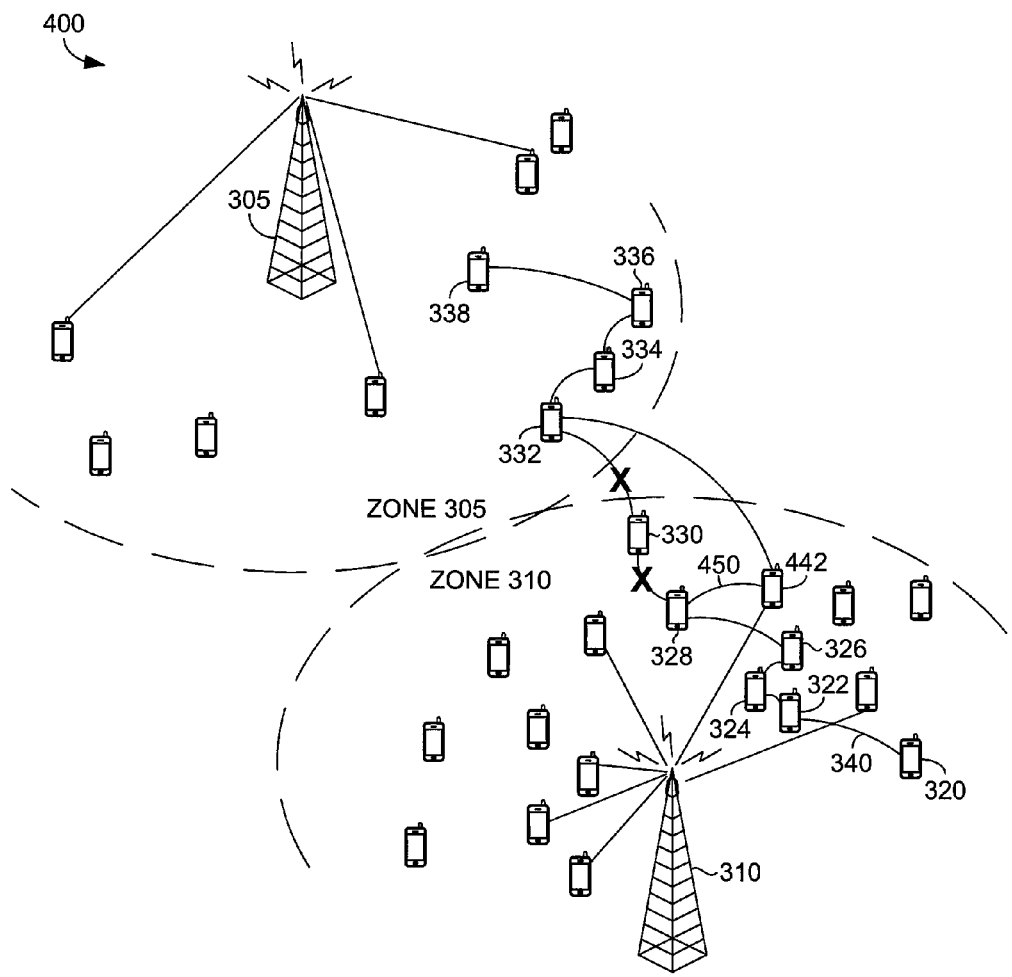

Turning now to FIGS. 3 and 4, adding and subtracting devices from an ad-hoc relay 340 are shown, in accordance with an embodiment of present invention. Both FIGS. 3 and 4 show a partial wireless access network 300. Base station 305 is within coverage area 306, and base station 310 is within coverage area 311. The wireless devices are depicted as smart phones, but embodiments of the present invention are not limited to smart phones. Both FIGS. 3 and 4 show an ad-hoc relay 340 that communicates wireless data from mobile device 320, located within the coverage area 311 to mobile device 338, which is located within the coverage area 305. In FIG. 3, the ad-hoc relay 340 comprises mobile devices 322, 324, 326, 328, 330, 332, 334, 336, and 338. Communications are relayed from mobile device 338 to base station 305 using the relay 305.

Turning now to FIG. 4, a device is removed and another substituted to the ad-hoc relay 340 during a data session. Mobile device 330 is removed from the ad-hoc relay and communications are now communicated from device 328 to device 442 and then on to device 332. From device 332 all the way to base station 305, the relay 340 includes the same devices as depicted in FIG. 3. A device may need to be updated or removed from the network when battery power falls below a threshold, or when the mobile device begins a communication session of its own. Other circumstances, such as the removal of the mobile device from the geographic area may create a need to substitute different mobile devices into the ad-hoc relay 340. Turning a mobile device off would also cause the device to be replaced within the ad-hoc relay 340. The ad-hoc relay 340 may be torn down when device 320 terminates the communication session.

Figure 5:
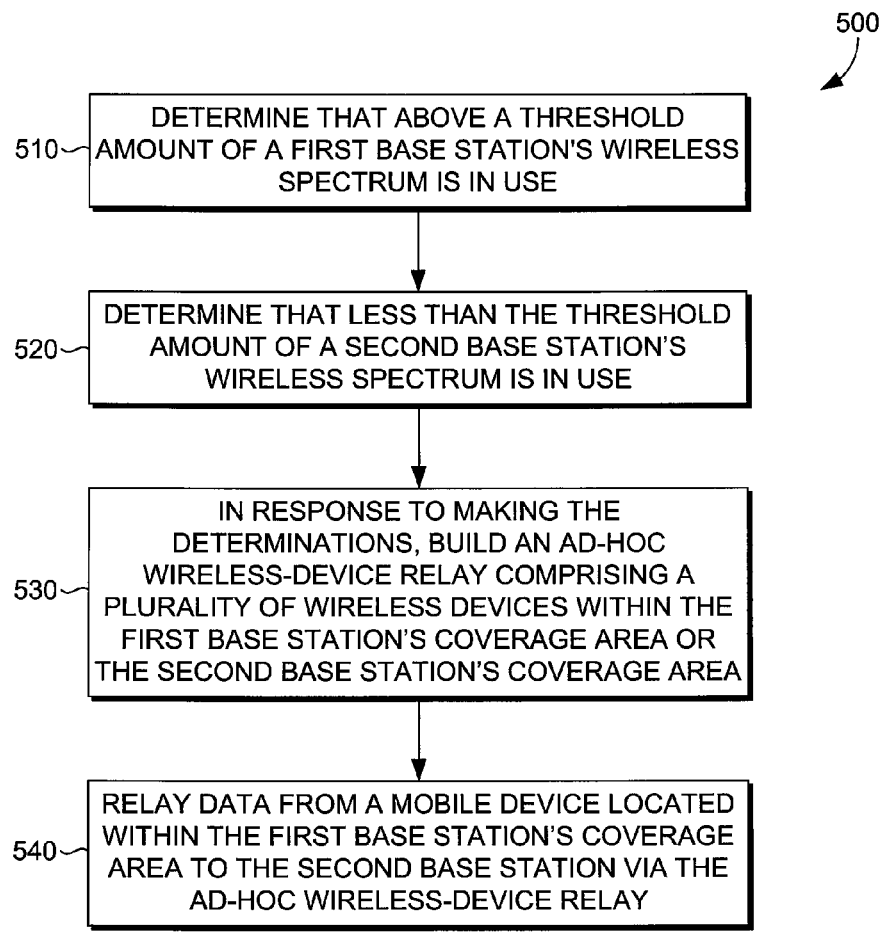
FIG. 5 is a flow chart showing a method for conserving bandwidth in a radio access network, in accordance with an embodiment of the present invention.

Turning now to FIG. 5, a method 500 for conserving bandwidth in a radio access network is shown, in accordance with an embodiment of present invention. The radio access network may be similar to those depicted in FIGS. 1-4. The radio access network includes at least a first base station and second base station. The base stations communicate with wireless devices using radio signals. Each base station may be allocated a specific set, or spectrum, of radio frequencies. In general, adjacent base stations will use a different radio frequency spectrum to avoid interference. Because the spectrum available to a base station is limited, the spectrum can become full as multiple mobile devices consume spectrum during communication sessions. Communication sessions can carry content, such as a movie, webpage, or song, and voice data such as a phone call.

At step 510, it is determined that a threshold amount of a first base station's wireless spectrum is in use. In one embodiment, the amount of spectrum use is determined by running a band pass filter. Other methods of determining the amount of usage are also possible. The threshold may be designated as a percentage of allocated spectrum or a number of frequencies within the spectrum.

At step 520, less than a threshold amount of a second base station's wireless spectrum is determined to be in use. In one embodiment, the second base station is in a coverage area adjacent to the first base station. As mentioned, the first base station and the second base station may be allocated different portions of spectrum.

At step 530, in response to making the determinations, an ad-hoc wireless-device relay is built comprising a polarity of wireless devices within the first base station's coverage area or the second base station's coverage area. As mentioned, wireless devices may be smart phones, wireless modems, tablets, laptops, wireless routers, or other devices connected to the radio access network. Devices are selected for inclusion in the relay based on an algorithm that considers several of the devices current characteristics. For example, the devices geographic distribution throughout the coverage areas is considered when selecting devices. The algorithm may include constraints that require devices to communicate with adjacent devices over less than a threshold distance. This allows the devices within the network to communicate over a shorter distance and conserve battery power. The devices may need to be in the on position but not engaged in a communication session. In other words, devices that are selected for inclusion in the relay may be in a stand-by mode. In one embodiment, a devices current battery charge is considered. Devices with a below the threshold battery charge may be excluded from the relay. On the other hand, devices that draw from a fixed power source, such as devices that are charging or wireless routers that do not run on a battery, may be preferred over other devices. Similarly, devices such as laptops or tablets that have larger battery storage capacity may be preferred for selection.

At step 540, data is relayed from a mobile device located within the first base station's coverage area to the second base station via the ad-hoc wireless-device relay. In one embodiment, the data is relayed on a frequency assigned to the second base station. This prevents interference with the first base station. In another embodiment, Wi-Fi or Bluetooth frequencies may be used to relay data depending on the proximity of adjacent devices within the relay. The final device within the second base station's coverage area relays the data to the second base station, which manages the communication session.

In one embodiment, the data is from an ongoing communication session with the first base station. In this case, the communication session is transitioned from the first base station to the second base station using the relay. Communication sessions that are assigned a best-effort quality of service may be selected for transition to an adjacent base station.

In another embodiment, a device's usage history is considered when it is selected for inclusion in a relay. A usage history that indicates infrequent usage in general or infrequent usage during the time when the relay is being built increases the probability that the device will be selected for inclusion in the relay. A device's current signal-to-noise ratio may also be considered. In one embodiment, devices with below a threshold amount that signals noise ratio are preferred. In another embodiment, devices with above a threshold signal-to-noise ratio are excluded from inclusion in the relay. In another embodiment, a device's recent movement history is considered when selecting devices for inclusion in the relay. In general, devices that are presently moving or have been moving recently are not favored for inclusion in the relay. Devices that are presently moving or have moved recently may create the need for the relay to be reconstituted if the device moves out of a useful range for the relay. Devices that are more or less stationary, such as a wireless router, may be preferred.

Figure 6:
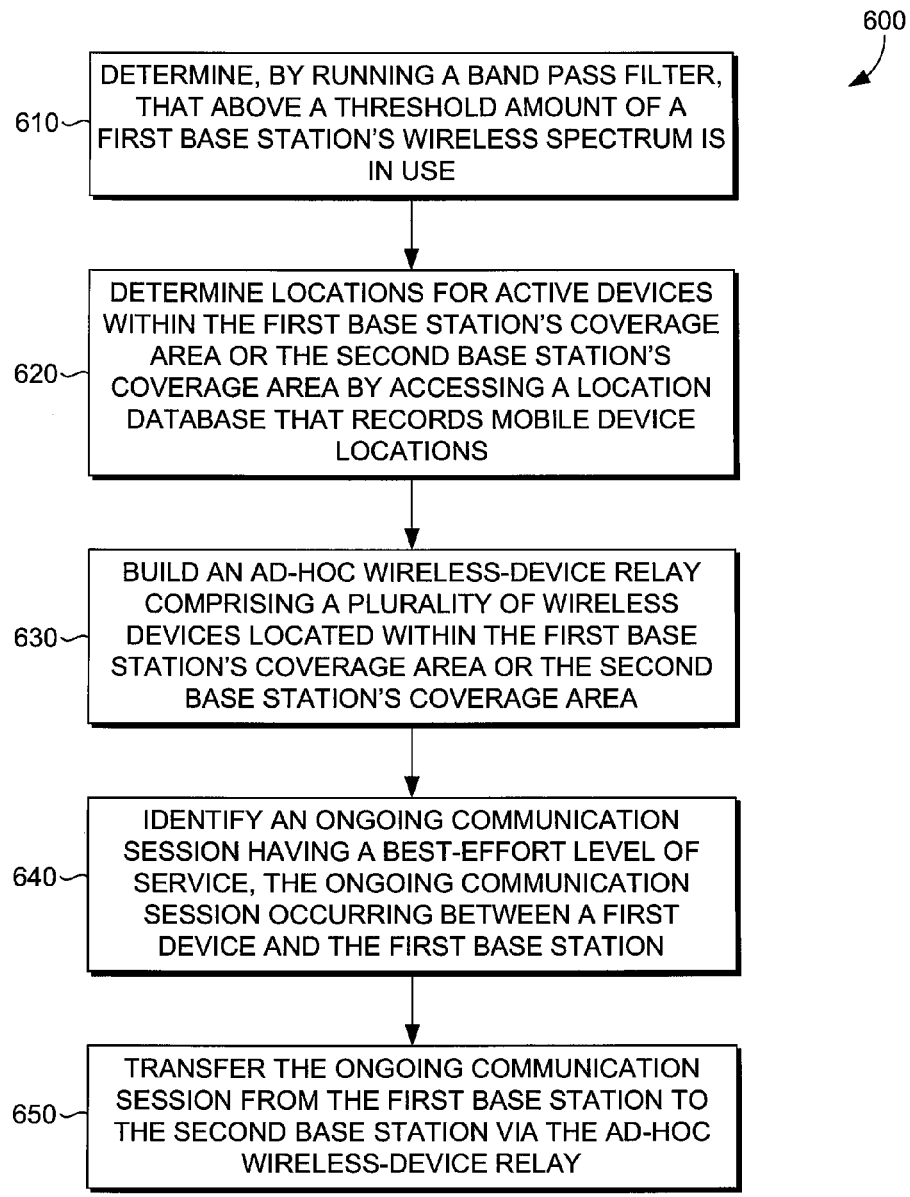
FIG. 6 is a flow chart showing a method of conserving wireless spectrum allocated to a first base station by routing communication sessions over an ad-hoc wireless-device relay to a second base station, in accordance with an embodiment of the present invention.

Turning now to FIG. 6, a method 600 of conserving wireless spectrum allocated to a first base station by routing data sessions over an ad-hoc wireless-device relay to a second base station. As mentioned, the first and second base stations may form part of a radio access network. The radio access network may provide connectivity to multiple devices. At step 610, a band pass filter is run to determine that above a threshold amount of a first base station's wireless spectrum is in use. At step 620, the location of active devices within the first base station's coverage area or the second base station's coverage area is determined by accessing a location database that records mobile device locations through the radio access network. The mobile device's location may be ascertained using GPS. The GPS is then communicated to a base station where the device's present location is recorded in the database.

At step 630, an ad-hoc wireless-device relay is built comprising a plurality of wireless devices located within the first base station's coverage area or the second base station's coverage area. The plurality of devices is selected based on being less than a threshold distance from each other. Selecting devices that are comparatively close to each other allows the devices to be used in the relay without consuming significant amounts of energy. A device may be notified that it is part of the device relay by sending an activation message to the device. The activation message may be in the form of an SMS message. The activation message may include a frequency to receive and to repeat. The activation may also include a broadcast strength for the device. Each device within the network may receive a unique message. The designated frequency for the data session may be the same across the devices, but other variables such as frequency or transmission strength may change. The central system is able to calculate the required radio signal strength using the location information for adjacent devices.

In one embodiment, the devices are preloaded with an application that allows them to serve as part of a relay. This application may temporarily manipulate other device settings to facilitate inclusion in the relay. The devices within the relay may not process the data but instead simply pass along the data to other devices.

At step 640, an ongoing communication session is identified. The communication session may have a best-effort level of service and is occurring between a first device and the first base station. At step 650, the ongoing communication session is transferred from the first base station to the second base station via an ad-hoc wireless-device relay. As mentioned, the devices within the ad-hoc relay may need to be dropped when a user of the device begins their own communication session. In this case, other suitable devices are located and added to the relay. In one embodiment, affected devices may receive an additional SMS update message that adjusts various broadcast characteristics. For example, a device may need to increase the radio signal strength based on a device moving or inclusion of a new device that is further away.

Figure 7:
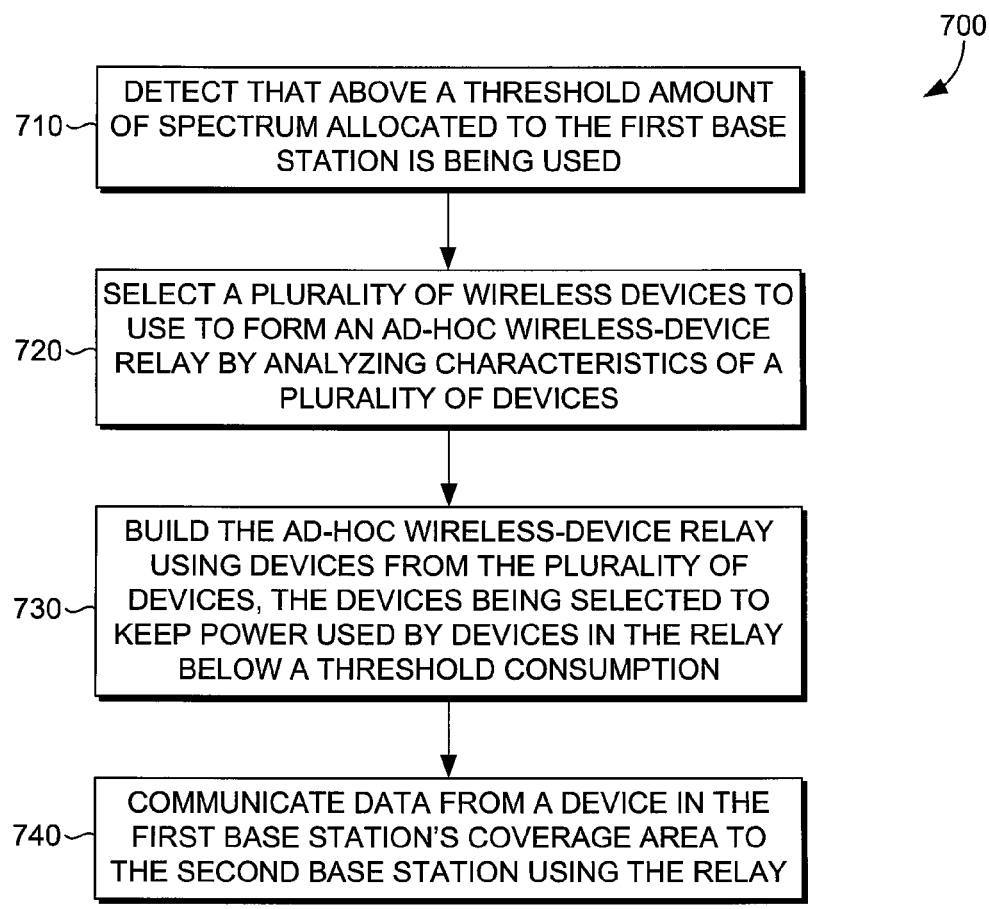
FIG. 7 is a flow chart showing a method of reducing bandwidth usage within a first base station's coverage area by routing communications to a second base station over an ad-hoc wireless-device relay, in accordance with an embodiment of the present invention.

Turning now to FIG. 7, a method 700 of reducing bandwidth usage within a first base station's coverage area by routing communications to a second base station over an ad-hoc device relay is shown, in accordance with an embodiment of the present invention. As mentioned, the base stations may be a part of a radio access network. At step 710, it is detected that above a threshold amount of spectrum allocated to the first base station is being used. At step 720, a plurality of wireless devices are selected for use to form an ad-hoc device relay by analyzing characteristics of the plurality of devices.

At step 730, the ad-hoc device relay is built using devices from the plurality of devices. The devices being selected to keep power usage by devices in the relay below a threshold consumption. At step 740, data is communicated from a device in the first base station's coverage area to the second base station using the relay.

Many different arrangements of the various components depicted, as well as components not shown, are possible without departing from the spirit and scope of embodiments of the present invention. Embodiments of the present invention have been described with the intent to be illustrative rather than restrictive. Certain features and subcombinations are of utility and may be employed without reference to other features and subcombinations and are contemplated to be within the scope of the claims.

The invention claimed is:

1. A method for conserving bandwidth in a radio access network, the method comprising:
   determining that a first base station's allocated spectrum usage exceeds a congestion threshold, wherein the congestion threshold is set as a percentage of allocated spectrum, and wherein exceeding the congestion threshold indicates at least one coverage area associated with the first base station is congested;
   determining that a second base station's allocated spectrum usage is below the congestion threshold, wherein such determination indicates at least one coverage area associated with the second base station is not congested;
   in response to making the determinations a network-based device initiates, building an ad-hoc wireless-device relay comprising a plurality of wireless devices within the first base station's coverage area or the second base station's coverage area; and
   relaying data from a mobile device located within the first base station's coverage area to the second base station via the ad-hoc wireless-device relay.

2. The method of claim 1, wherein the method further comprises selecting, using a selection algorithm that considers several device characteristics, the plurality of wireless devices from a larger plurality of active wireless devices located within the first base station's coverage area or the second base station's coverage area.

3. The method of claim 2, wherein the device characteristics comprise a usage history associated with a device, and wherein the selection algorithm increases a device's probability of selection when the usage history indicates lower than a threshold amount of usage.

4. The method of claim 2, wherein the device characteristics comprise a device's location, and wherein the plurality of wireless devices are selected to be less than a designated geographic distance between devices.

5. The method of claim 2, wherein the device characteristics comprise a signal-to-noise ratio, and wherein the selection algorithm increases a devices probability of selection when a device's signal-to-noise ratio is lower than a threshold ratio.

6. The method of claim 1, wherein said relaying occurs over a wireless frequency assigned to the second base station.

7. The method of claim 1, wherein said data is of a type assigned to a best-effort quality of service.

8. One or more non-transitory computer-readable media having computer-executable instructions embodied thereon that when executed by a computing device perform a method of conserving wireless spectrum allocated to a first base station by routing communication sessions over an ad-hoc wireless-device relay to a second base station, the method comprising:
   determining, by running a band pass filter, that a first base station's allocated spectrum usage exceeds a congestion threshold wherein the congestion threshold is set as a percentage of allocated spectrum, and wherein exceeding the congestion threshold indicates at least one coverage area associated with the first base station is congested;
   determining locations for active devices within the first base station's coverage area or the second base station's coverage area by accessing a location database that records mobile device locations;
   in response to making the determinations a network-based device initiates, building an ad-hoc wireless-device relay comprising a plurality of wireless devices located within the first base station's coverage area or the second base station's coverage area, wherein the plurality of wireless devices are selected based on being less than a threshold distance from each other;
   identifying an ongoing communication session having a best-effort level of service, the ongoing communication session occurring between a first device and the first base station; and
   transferring the ongoing communication session from the first base station to the second base station via the ad-hoc wireless-device relay.

9. The media of claim 8, wherein the threshold distance is selected to consume less than a designated amount of power to relay data to another device in the ad-hoc wireless-device relay.

10. The media of claim 8, wherein the method further comprises:
    determining that one device within the ad-hoc wireless-device relay is beginning a separate communication session; and
    building a new ad-hoc device relay that does not include the one device.

11. The media of claim 10, wherein building the new ad-hoc device relay comprises adding one or more additional devices to replace the one device.

12. The media of claim 8, wherein the plurality of wireless devices are selected, in part, based on battery-charge level.

13. The media of claim 8, wherein the first base station's coverage area is adjacent to the second base station's coverage area.

14. One or more non-transitory computer-readable media having computer-executable instructions embodiment thereon that when executed by a computing device perform a method of reducing bandwidth usage within a first base station's coverage area by routing communications to a second base station over an ad-hoc wireless-device relay, the method comprising:
    detecting that the first base station's allocated spectrum usage exceeds a congestion threshold, wherein the congestion threshold is set as a percentage of allocated spectrum, and wherein exceeding the congestion threshold indicates at least one coverage area associated with the first base station is congested;
    selecting a plurality of wireless devices to use to form an ad-hoc wireless-device relay by analyzing characteristics of a plurality of devices;
    in response to the detecting and selecting a network-based device initiates, building the ad-hoc wireless-device relay using devices from the plurality of devices, the devices being selected to keep power used by devices in the relay below a threshold consumption; and
    communicating data from a device in the first base station's coverage area to the second base station using the relay.

15. The media of claim 14, wherein the characteristics comprise historical usage patterns for a device, and wherein devices with a history of comparatively less use are favored for inclusion in the relay.

16. The media of claim 14, wherein the characteristics comprise current movement indications, and wherein devices that are moving are excluded from inclusion in the relay.

17. The media of claim 14, wherein the characteristics comprise movement history, and wherein devices that move infrequently are favored for inclusion within the relay.

18. The media of claim 14, wherein the characteristics comprise current battery charge for a device, and wherein devices with lower than a threshold charge are excluded from selection for the relay.

19. The media of claim 14, wherein the characteristics comprise power source for a device, and wherein devices with a nonbattery power source are favored over battery-powered devices for inclusion in the relay.

20. The media of claim 14, wherein the method comprises communicating an activation message to each of the devices in the relay, the activation message providing information that allows devices to identify the data and relay the data to the subsequent device with an appropriate amount of signal strength for a distance between an adjacent device in the relay.

* * * * *